United States Patent [19]

Takahashi et al.

[11] Patent Number: 5,139,364
[45] Date of Patent: Aug. 18, 1992

[54] AUTOMATIC SWING FISHWAY APPARATUS

[75] Inventors: Tatuki Takahashi; Tosiyuki Yokota, both of Nagasaki; Kunikazu Arakeda, Hiroshima; Toshinori Tabuchi; Koji Shitami, both of Higashihiroshima, all of Japan

[73] Assignees: Nagasaki-Ken, Nagasaki; Hokokukogyo Co., Ltd., Hiroshima, both of Japan

[21] Appl. No.: 721,434

[22] PCT Filed: Nov. 5, 1990

[86] PCT No.: PCT/JP90/01437

§ 371 Date: Jul. 5, 1991

§ 102(e) Date: Jul. 5, 1991

[87] PCT Pub. No.: WO91/06710

PCT Pub. Date: May 16, 1991

[30] Foreign Application Priority Data

Nov. 6, 1989 [JP] Japan .................................. 1-288420

[51] Int. Cl.⁵ .................................................. E02B 8/08
[52] U.S. Cl. .......................................... 405/81; 405/92; 405/100
[58] Field of Search .................. 405/81, 82, 83, 92, 405/93, 96, 97, 100, 101

[56] References Cited

U.S. PATENT DOCUMENTS 4,526,494 7/1985 Eicher .................................... 405/83
4,657,434 4/1987 Woolnough ........................... 405/81

FOREIGN PATENT DOCUMENTS

17941 5/1984 Japan .

*Primary Examiner*—David H. Corbin
*Attorney, Agent, or Firm*—Oliff & Berridge

[57] ABSTRACT

An automatic swing fishway apparatus for allowing fish to swim upstream can be installed in dams or weirs to accommodate fluctuations in upstream water levels. The apparatus includes a hydraulic chamber in a bottom of a waterway which bypasses a dam, and a fishway device body. The fishway device body includes a fishway portion in which a plurality of dividing walls are located vertically on a floor plate provided above the hydraulic chamber and a buoyant sealed portion is provided beneath a floor. The fishway device body also includes a main shaft arranged on a downstream side so that the fishway device body can rotate freely. The hydraulic chamber is connected to an upstream end of the fishway device body through an overflow weir and the hydraulic chamber is connected to a downstream waterway via an outflow port. An inclination of the fishway device body is changed in accordance with a water level of the dam by equalizing an amount of water flowing over the overflow weir into the hydraulic chamber to an amount of water flowing out the outflow port.

1 Claim, 9 Drawing Sheets

AUTOMATIC SWING FISHWAY APPARATUS

FIELD OF THE INVENTION

The present invention relates to an automatic swing fishway apparatus to allow fish to swim upstream. The apparatus is installed in dams or weirs and accommodates fluctuations in upstream water levels.

BACKGROUND OF THE INVENTION

Figure 10:
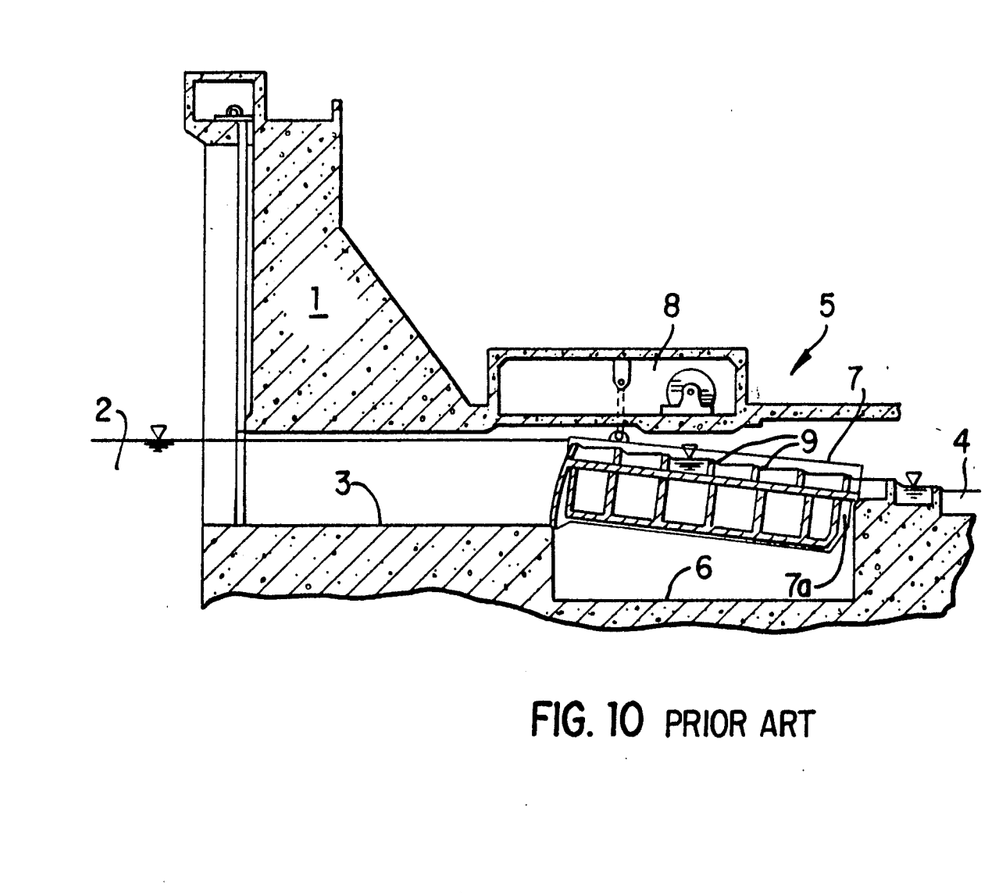
FIG. 10 is a cross-sectional side view of the swing fishway apparatus of the prior art.

As indicated in FIG. 10, this type of apparatus involves a reservoir 2, formed by a dam 1, being connected to stationary fishway 4, formed from a downstream side, via guiding waterway 3, with swing fishway apparatus 5 provided at an intermediate location in the waterway. Water pressure chamber 6 is provided in said waterway, and a fishway device body 7 is housed within said hydraulic chamber and supported by the downstream end (shaft 7a). The upstream end of the fishway device body 7 is lifted by winch 8. A plurality of dividing walls 9 are provided in an upper portion of the fishway device body 7. Fishway device body 7 is tilted corresponding to a water level of reservoir 2 with shaft 7a of the downstream end serving as a fulcrum. In this case, the operator must check the water level and then operate winch 8 to lift fishway body 7 and tilt it to match an upstream water level, so the apparatus is difficult to use, since it responds slowly to fluctuating water levels.

Figure 11:
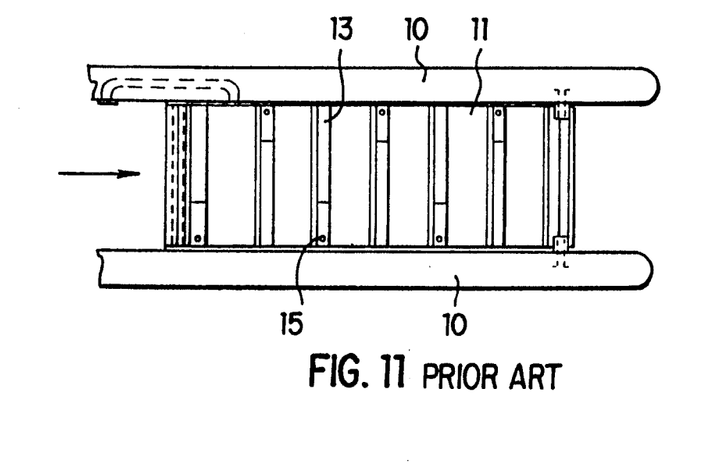
FIG. 11 is an overhead view of another swing fishway apparatus of the prior art.
Figure 12:
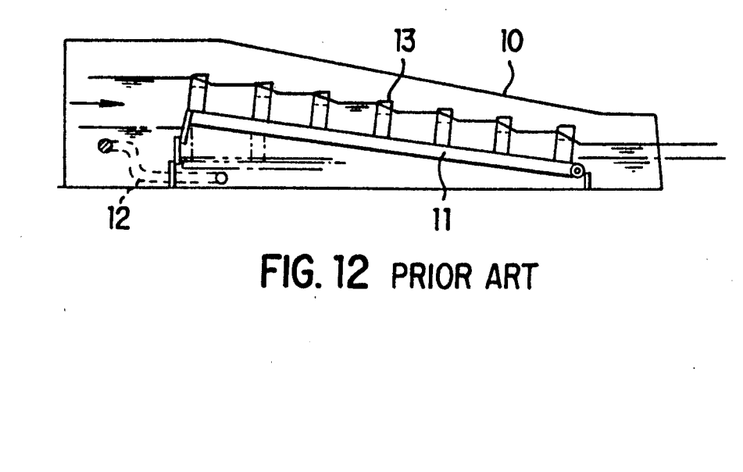
FIG. 12 is a cross-sectional side view of FIG. 11.
Figure 13:
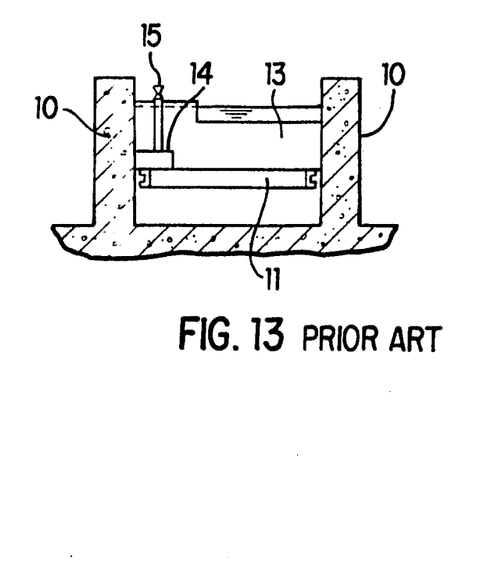
FIG. 13 is a transverse cross-sectional view of FIG. 11.

Japanese Utility Model Publication No. 59-17941 discloses an invention in which a fishway device body inclines to match an upstream water level automatically without the use of winch 8. As indicated in FIGS. 11, 12 and 13, frame 11, which provides small openings between side walls 10 on both sides of the waterway, is supported by a shaft on the downstream end while allowing to swing freely. One end of connecting tube 12, which is opened in the bottom of frame 11, opens into the upstream water. Floats 13 in the shape of plates are provided vertically at constant intervals on frame 11. Regulatory chambers 14 are provided within floats 13 and water is fed to the chambers 14 from water feed ports 15 to regulate the buoyancy of floats 13. Therefore, frame 11 is supported by the buoyancy of floats 13 and the water pressure which acts on a bottom surface of frame 11.

Since frame 11 is not floating in the water solely by floats 13, an angle of inclination of frame 11 is set by regulating the buoyancy by introducing water into regulatory chambers 14 from water feed ports 15 at installation.

However, since the buoyancy fluctuates according to the angle of inclination, when the water level in the reservoir rises, frame 11 rises too high resulting in a decrease in an amount of water which overflows floats 13. Thus, when the depth of the overflow water is insufficient, it is not suitable as a fishway. In addition, when the overflow water level is high, an angle of inclination of frame 11 becomes too small in that the water level in the reservoir lowers, resulting in an excessive amount of overflow water. Thus, a fishway is desired which achieves a suitable overflow water depth regardless of the height of the upstream water level.

SUMMARY OF THE INVENTION

An object of the present invention is to provide an automatic swinging fishway device that is able to accurately follow fluctuations in an upstream water level.

In order to accomplish this object, a fishway device body consisting of a fishway section, on which a plurality of dividing walls are provided vertically on a floor plate, and a sealed section beneath the floor, is arranged in an hydraulic chamber, providing the hydraulic chamber on a bottom of a waterway which bypasses a dam or weir. The fishway device body is allowed to rotate freely by means of a main shaft on a downstream side. The hydraulic chamber is connected to an upstream waterway via an overflow dam mounted on the upstream side of the fishway device body, and the hydraulic chamber is connected to the downstream waterway via an outflow port having a cross-sectional area smaller than the length of the overflow dam.

As a result of having the construction described above, the fishway device body is lifted up by the buoyancy of the sealed portion following the flowing in of water that has overflowed the overflow dam into the hydraulic chamber. If the water level in the reservoir rises, the amount of water flowing into the hydraulic chamber becomes greater than that flowing out. The fishway device body then rotates centered on the downstream end so that the upstream side rises and an angle of inclination of the fishway device body becomes larger. Since the overflow dam also rises at this time, the amount of overflow is decreased until the fishway device body stops at a position at which it is balanced. The depth of the overflow water of the dividing walls is thus maintained. In addition, if the water level in the reservoir lowers, the amount of overflow will decrease and the amount of water flowing in will become less than that flowing out. As a result, the water in the hydraulic chamber will decrease and the fishway device body will be lowered. Thus, the amount of overflow water will increase until the fishway device body stops at a position at which it is balanced.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

The following provides a description of one embodiment of the present invention based on the attached drawings.

Figure 8:
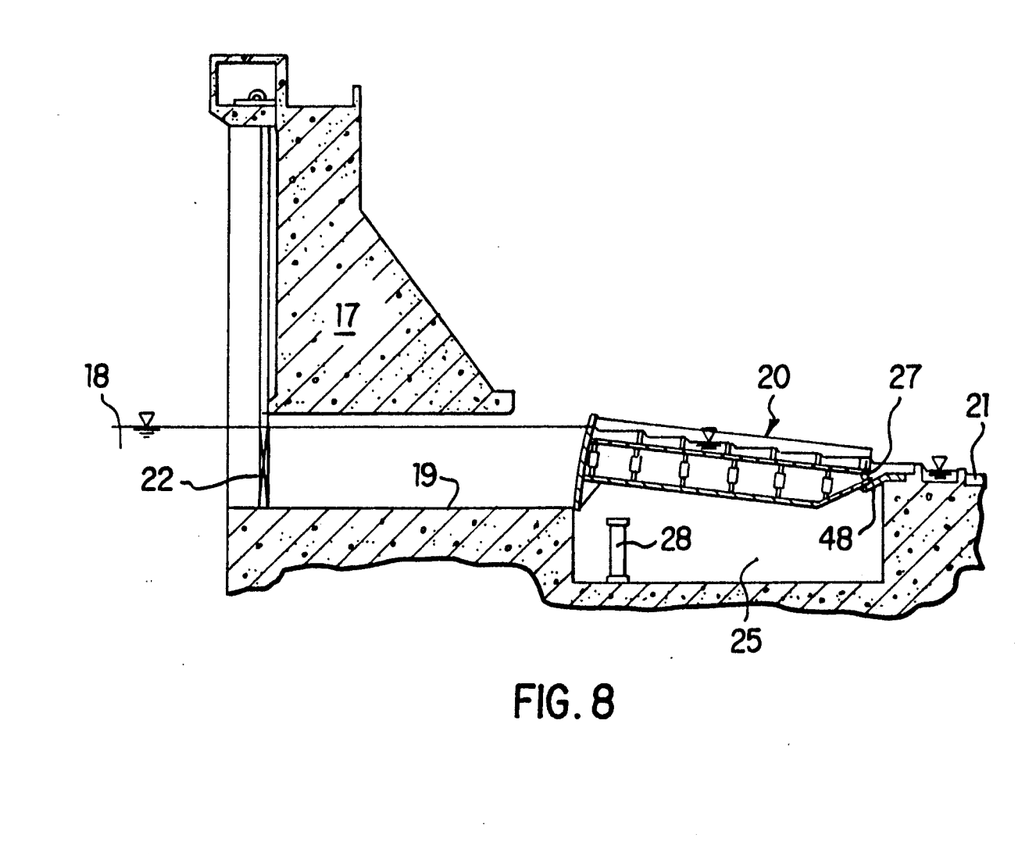
FIG. 8 is cross-sectional side view of a dam using one embodiment of the automatic swing fishway apparatus.
Figure 9:
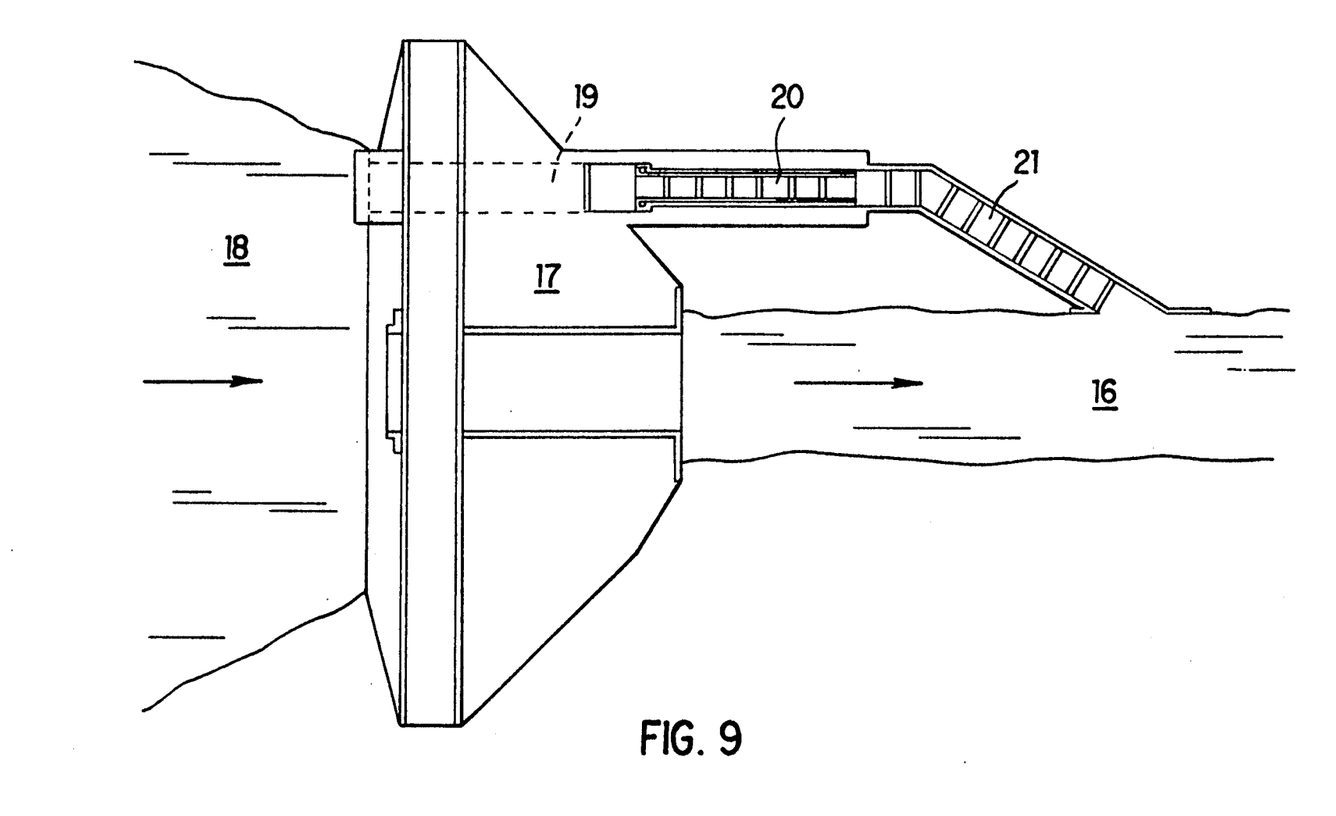
FIG. 9 is an overhead view of FIG. 8.

As is indicated in FIGS. 8 and 9, dam 17 is constructed in river 16. Guiding waterway 19 which connects with reservoir 18 is formed in dam 17, and is connected to stationary fishway 21 which merges with the downstream flow of the river via swing fishway apparatus 20. Guiding waterway 19 is of sufficient depth to allow the water level to remain constant from the set highest water level to the lowest water level with respect to reservoir 18. An emergency dam door 22 is provided at the entrance to guiding waterway 19 which is normally raised up.

Figure 1:
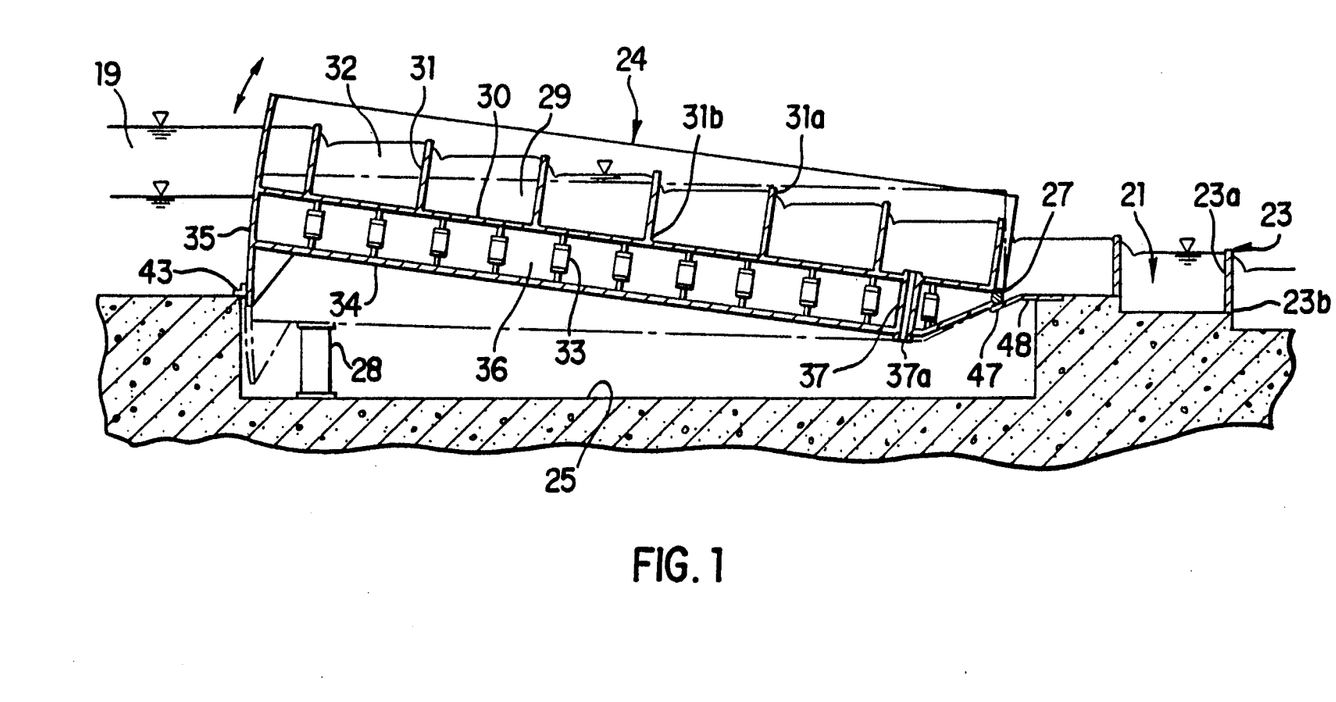
FIG. 1 is a cross-sectional side view of one embodiment of the automatic swing fishway apparatus of the present invention.
Figure 2:
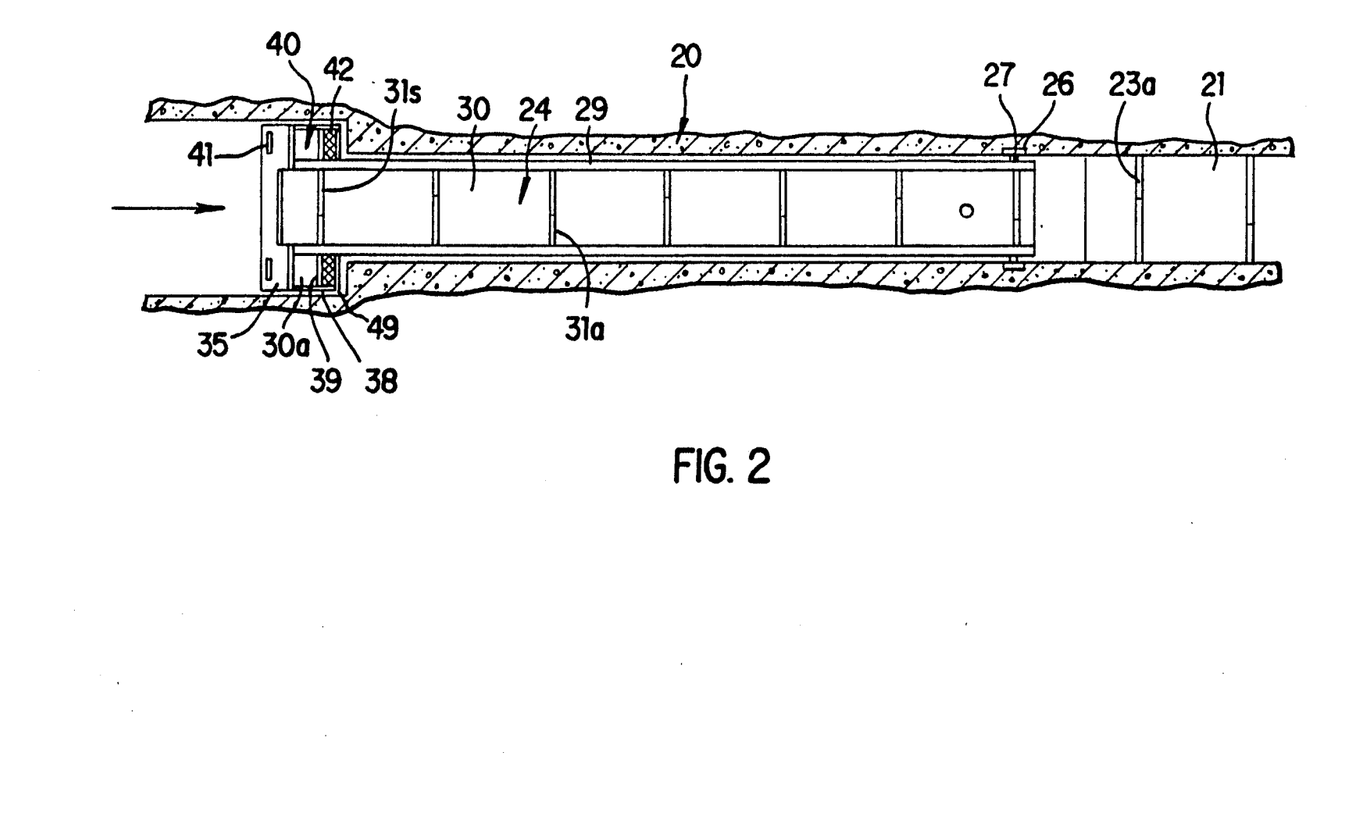
FIG. 2 is an overhead view of FIG. 1.
Figure 5:
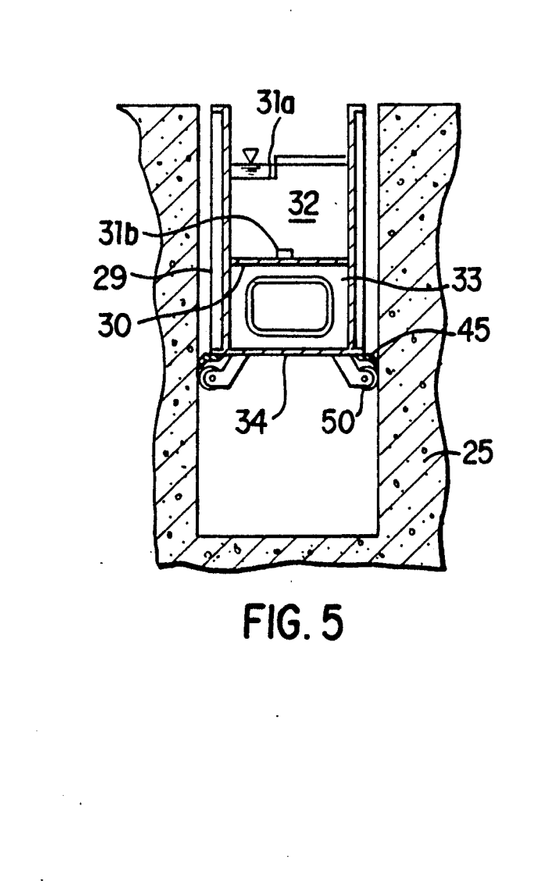
FIG. 5 is a transverse cross-sectional view of the downstream side of one embodiment of the automatic swing fishway apparatus.

As is indicated in FIGS. 1, 2 and 5, stationary fishway 21 is divided with a plurality of dividing walls 23 provided at fixed intervals on an inclined surface. The bottom of said stationary fishway is typically in the form of steps. A portion of the tops of dividing walls 23 is cut away resulting in the formation of notches 23a. Water is allowed to flow down through these portions. In addition, small-diameter mud discharge ports 23b are opened in the bottom portions of dividing walls 23.

Fishway device body 24 of swing fishway apparatus 20 is contained within hydraulic chamber 25 that is opened in the bottom portion which connects guiding waterway 19 and stationary fishway 21. The lower end of fishway device body 24 is anchored on main shaft 27 which engages with bearing 26 embedded in the upper portion of the side wall near the downstream end of hydraulic chamber 25, and is allowed to rotate freely so as to change the dam height of the upper end. In addition, the width of the upstream end of hydraulic chamber 25 is spread out and frame 28 is installed on the bottom which maintains the orientation of fishway device body 24 at its lowest point.

Fishway portion 32 is provided on floor plate 30, on which side plates 29 are mounted on both sides. Fishway portion 32 is also divided by a plurality of dividing walls 31 in which are formed notches 31a by cutting out a portion of the top ends of said dividing walls 31. Furthermore, small-diameter liquid discharge ports are opened in the bottom portions of dividing walls 31. In addition, bottom plate 34 is attached beneath floor plate 30 on which is arranged porous support members 33, and the downstream end of bottom plate 34 is bent upward to close off the space between bottom plate 34 and floor plate 30, while the upstream end closes off the space between bottom plate 34 and floor plate 30 as a result of the presence of arc-shaped end plate 35 which centers on main shaft 27. Sealed portion 36 is formed beneath the floor plate. In addition, outflow tube 37, which connects the lowest flow portion divided with dividing walls 31 and hydraulic chamber 25, is mounted passing through sealed portion 36, and outflow port 37a which opens into hydraulic chamber 25 is able to follow decreases in the water level of reservoir 18.

Figure 3:
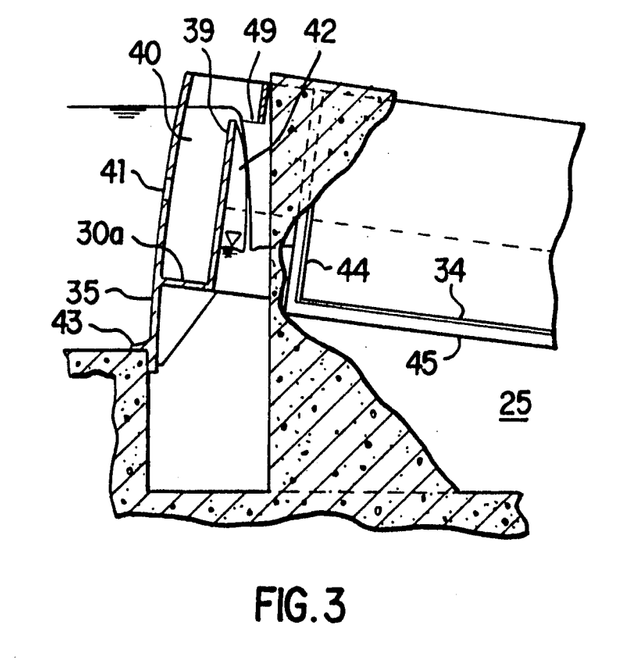
FIG. 3 is a cross-sectional view of the upstream side of one embodiment of the automatic swing fishway apparatus.
Figure 6:
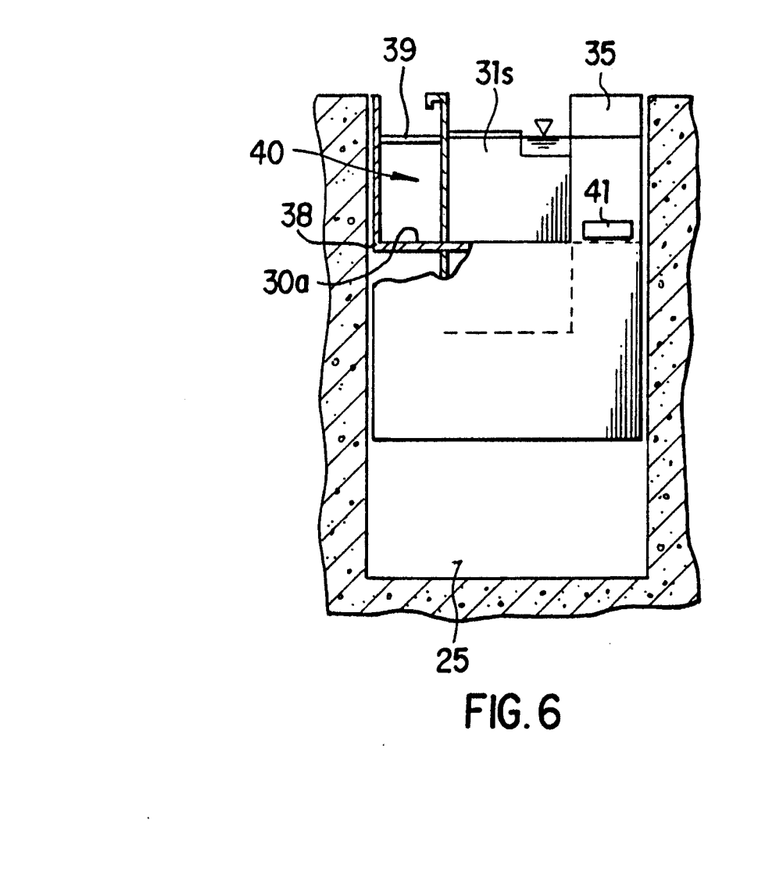
FIG. 6 is a transverse cross-sectional view of the upstream side of one embodiment of the automatic swing fishway apparatus.
Figure 7:
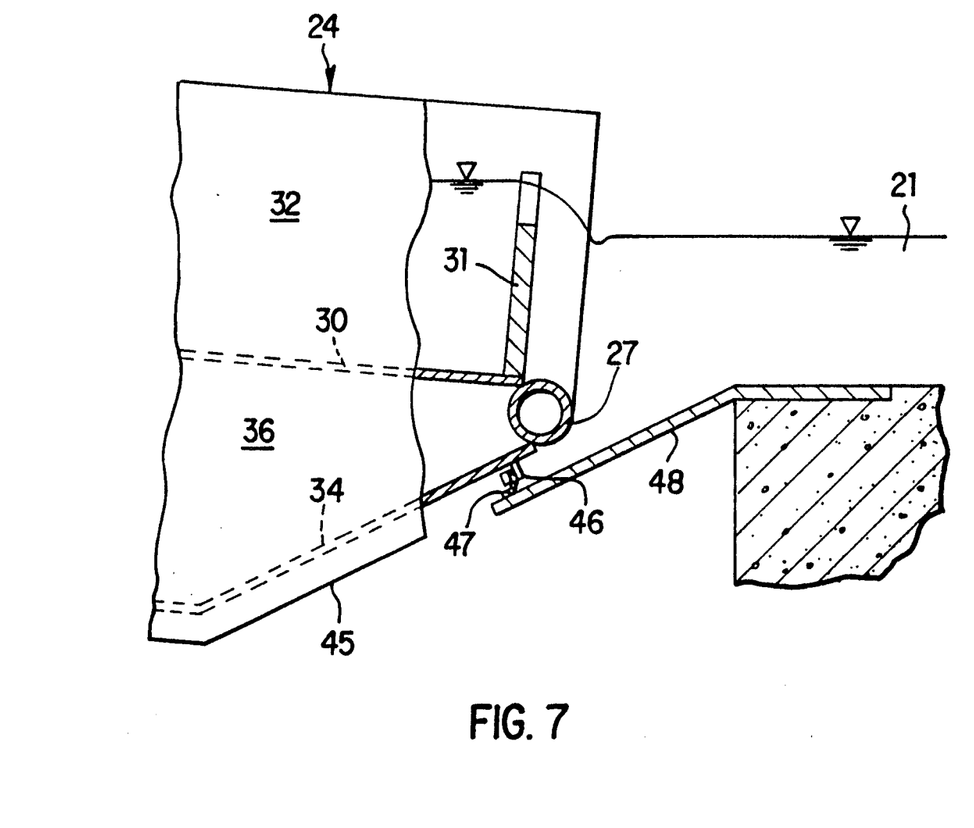
FIG. 7 is a cross-sectional view of the downstream end of one embodiment of the automatic swing fishway apparatus.

As is indicated in FIGS. 2, 3 and 6, widened portions 30a are formed on floor plate 30 protruding on both sides of its upstream end. Side walls 38 are mounted on both ends of said widened portions, and overflow dam 39 is provided behind said widened portions, with retarding basins 40 formed on the left and right by end plate 35. Inflow ports 41 are provided slightly above the floor surface 30 of fishway portion 32 of end plate 35 which comprises retarding basins 40, having a suitable size in consideration of preventing infiltration of waves and debris as well as allowing the passage of the specified amount of water. The side ends of end plate 35 are protruding to the side slightly more than the front of retarding basins 40. In addition, water feed tanks 42 are formed downstream from overflow dam 39 by the side walls of hydraulic chamber 25, and are also connected with hydraulic chamber 25. The bottom of end plate 35 is extended so that it remains in contact with the side walls of the upstream side of hydraulic chamber 25 even when fishway device body 24 is at its maximum inclination. In addition, dividing wall 31s, which is the farthest upstream, is in the same plane as overflow dam 39. The upper end of overflow dam 39 is several centimeters lower than dividing wall 31s, and the diameter of outflow port 37a is sufficiently smaller than the length of overflow dam 39.

The following provides an explanation of the stoppage of water moving in sequence from the upstream side.

Figure 4:
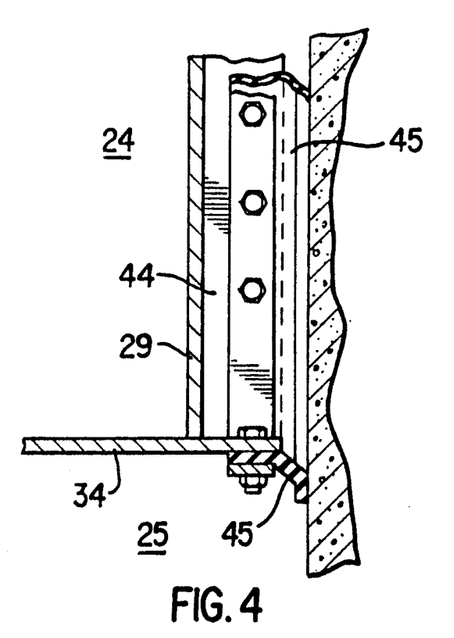
FIG. 4 is a cross-sectional side view of the key components of one embodiment of the automatic swing fishway apparatus.

Front rubber water stopper 43 on the bottom of the downstream end of guiding waterway 19 is provided so as to make contact with the upstream side surface of end plate 35 to stop the flow of water on the upstream side. In addition, as is indicated in FIG. 4, an opening of suitable size is provided between fishway device body 24 and hydraulic chamber 25 so as to allow the discharge of leakage water. Bottom plate 34 protrudes to the side farther than side plates 29 and is anchored to its bottom surface and upstream end. Side rubber water stopper 45 is mounted on the upstream surface of vertical rubber attachment piece 44 which rises vertically at a right angle from that point. The end of side rubber water stopper 45 makes contact with the side wall surface of hydraulic chamber 25 which is given a resin coating. Thus, it is obvious that the position of vertical rubber attachment piece 44 is slightly to the downstream side of the downstream end of feed water tank 42. The downstream end of side rubber water stopper 45 extends to the bottom of main shaft 27. With respect to the stopping of the flow of water on the downstream end, as is indicated in FIG. 5, back rubber attachment piece 46 is mounted in the direction of the width of the waterway on the surface of floor plate 34 near main shaft 27, and both ends in opposition to each other forming a slight gap with the rear surface of side rubber water stopper 45. Back rubber water stopper 47 is mounted in the shape of a plate on the upstream surface of back rubber attachment piece 46, and both ends are in contact with the rear surface of side rubber water stopper 45. In addition, an opening is provided between main shaft 27 and the downstream end of hydraulic chamber 25 so that the operator can enter the hydraulic chamber 25. Back closing member 48, which is mounted on the bottom of stationary fishway 21 and extends to the upstream side, makes contact with back rubber water stopper 47.

Furthermore, when the water level of reservoir 18 is at the lowest level, the difference between the minimum water level of the reservoir 18 and the water level of the furthest downstream compartment the downstream is sufficiently large so that if the potential inside hydraulic chamber 25 becomes equal to the minimum water level of the main current, the fishway device body 24 will rise, and if it becomes equal to the water level of the furthest downstream compartment into which outflow tube 37 opens, fishway device body 24 will lower. Screen 49 is mounted near the upper end of water feed tank 42 so that it can be attached and removed as desired. In addition, a pair of side rollers 50 are mounted on the bottom of floor plate 34 near the upstream end.

The planar surface area of water feed tank 42 should be as small as possible and the lower end of retarding basins 40 should be sufficiently low so that it is not exposed in the air.

When a free water surface is formed beneath the fishway device body 24, the operation of fishway device body 24 may no longer be smooth. Thus, although the shape of fishway device body 24 is rectangular in this embodiment, it may inhibit the formation of a free water surface by being in the basic shape of a fan.

The following explanation describes one embodiment of the operation of the present invention. The explanation starts with the fishway device body 24 stationary and supported by frame 28. When dam 17 is completed, accumulation of water begins and the water level rises in reservoir 18, and the water level in retarding basins 40, connected to reservoir 18 via guiding waterway 19 and inflow port 41, will also rise. Then, before the depth of the overflow water of notches 31a formed in dividing walls 31 becomes excessive, overflow begins over overflow dam 39 and water flows into hydraulic chamber 25 through water feed tank 42. Together with water filling hydraulic chamber 25, outflow of water also begins from outflow port 37a. At that time, since the length of overflow dam 39 is sufficiently larger in comparison to outflow port 37a, the water level in water feed tank 42 rises and the water pressure which acts on the bottom of fishway device body 24 increases. The upstream end of fishway device body 24 rises, pivoting on main shaft 27 on the downstream end causing fishway device body 24 to become inclined. When fishway device body 24 rises, the depth of the overflow water flowing over overflow dam 39 naturally decreases, and the angle of inclination of fishway device body 24 is maintained as a result of reaching a state of balance with this water pressure. If the upstream water level rises and the depth of the overflow water increases even slightly, although the fishway device body 24 rises due to this water pressure, since overflow dam 39 also rises, the depth of the overflow water flowing over overflow dam 39 decreases. As a result, the amount of water flowing into water feed tank 42 that had once been increasing now decreases, and its water level returns to its original level. Since the water pressure acting on the bottom of fishway device body 24 becomes constant, fishway device body 24 becomes motionless and the depth of the overflow water flowing over notches 31a is maintained at a proper level. The case in which the upstream water level becomes lower will be described later.

Next, an explanation is provided regarding the magnitude of each movement of swing fishway apparatus 20. In the prior art, although a resistance when fishway device body 24 begins to move is in the form of static friction resistance and is comparatively large, once it begins to move, this resistance becomes kinetic friction resistance and decreases dramatically. Thus, the movement of fishway device body 24 tends to be too large.

In the case of the swinging fishway device 20 of the present invention, since the surface area of water feed tank 24 is made to be sufficiently small in comparison with the planar surface area of hydraulic chamber 25, when fishway device body 24 rises even only slightly, the water level in water feed tank 42 decreases considerably resulting in a dramatic decrease in operating force. Therefore, there is no possibility of fishway device body 24 demonstrating a large movement all at once.

However, if the rise in the water level of reservoir 18 continues, as the amount of water flowing in from overflow dam 39 gradually increases, fishway device body 24 continues to rise gradually.

The following explanation describes the present invention when fishway device body 24 lowers. When the water level of reservoir 18 lowers and the depth of the overflow water flowing over overflow dam 39 decreases slightly, the value of the reduction in the amount of water flowing into water feed tank 42 becomes large. Therefore, since the amount of water being discharged from outflow port 37a cannot be completely replenished, the water level in water feed tank 42 decreases and the water pressure acting on the bottom of fishway device body 24 also decreases causing it to lower. As previously described, each movement of fishway device body 24 is extremely small. As the size of outflow port 37a is determined in consideration of the rate of decrease of the water level of reservoir 18, there is no sudden decrease in the amount of water flow within the fishway portion 32 since it cannot completely follow the decrease in the water level of reservoir 18.

Next, an explanation is provided regarding the problem of leakage of water from the end of side rubber water stopper 45. Since the gap between side plate 29 of fishway device body 24 and the side wall of hydraulic chamber 25 is of a suitable size, water that has leaked is able to merge with the upstream end of stationary fishway 21 through the gap.

As described above, the present invention automatically rotates the fishway device body while following the water level of the reservoir through the utilization of the natural force of water flow and without using mechanical force, while also maintaining the depth of the overflow water, and the flow volume, at a nearly constant level regardless of the water level of the reservoir. Moreover, management and construction costs of the overall system can be reduced since the present invention provides only an overflow dam and outflow port connected to the inside of an hydraulic chamber which is sealed with the fishway device body.

We claim:

1. An automatic swing fishway apparatus comprising:
   a hydraulic chamber provided in a bottom of a waterway which bypasses a dam; and
   a fishway device body comprising: a fishway portion having a floor plate and a plurality of dividing walls provided vertically on the floor plate, said fishway portion being provided above said hydraulic chamber; a sealed buoyant portion provided beneath the floor plate; said fishway device body having an upstream end and a downstream end; said fishway device body being provided with a main shaft arranged at the downstream end of said fishway device body so that the fishway device body can rotate freely, an overflow weir at the upstream end of the fishway device body; means for connecting said hydraulic chamber to an upstream end of said fishway device body through the overflow weir; and an outflow port for connecting said hydraulic chamber to a downstream waterway, wherein the inclination of the fishway device body is changed in accordance with a water level of said dam by equalizing an amount of water flowing over the overflow weir into the hydraulic chamber to an amount of water flowing from the hydraulic chamber via the outflow port.

* * * * *